United States Patent [19]

Hickinbotham

[11] 3,712,603
[45] Jan. 23, 1973

[54] SUSPENSION UNIT FOR VEHICLE SEATS

[76] Inventor: William Percy Hickinbotham, 253 Betsy Lane, Stafford, England

[22] Filed: Feb. 16, 1971

[21] Appl. No.: 115,160

[30] Foreign Application Priority Data

Feb. 17, 1970 Great Britain.....................7,465/70

[52] U.S. Cl..............................267/131, 267/64 R
[51] Int. Cl................................................F16c 5/00
[58] Field of Search.............267/131, 130, 132, 117

[56] References Cited

UNITED STATES PATENTS 3,486,417  12/1969  Di Vito et al.........................267/131
3,168,278  2/1965  Ogden..................................267/117

FOREIGN PATENTS OR APPLICATIONS 642,985  7/1962  Italy..................................269/131

Primary Examiner—James B. Marbert
Attorney—Friedman & Goodman

[57] ABSTRACT

A suspension unit primarily for vehicle seats comprises a block-like body formed with two intercommunicating chamber containing hydraulic fluid, and valve means for controlling the rate of flow of fluid between the chambers produced by movement of the piston in its chamber. One of the chambers accommodates a piston and the other a variable volume pre-pressurized flexible bay which contains a preselected quantity of compressed gas and is arranged to pressurize the fluid in the chambers. The body of the unit is also formed with a hydraulic reservoir and with a bore which accommodates a combined pump and release valve operable by a common handle and reciprocable plunger for transferring fluid between the reservoir and the chambers to adjust the pressurization of the fluid by compression or expansion of the container.

7 Claims, 4 Drawing Figures

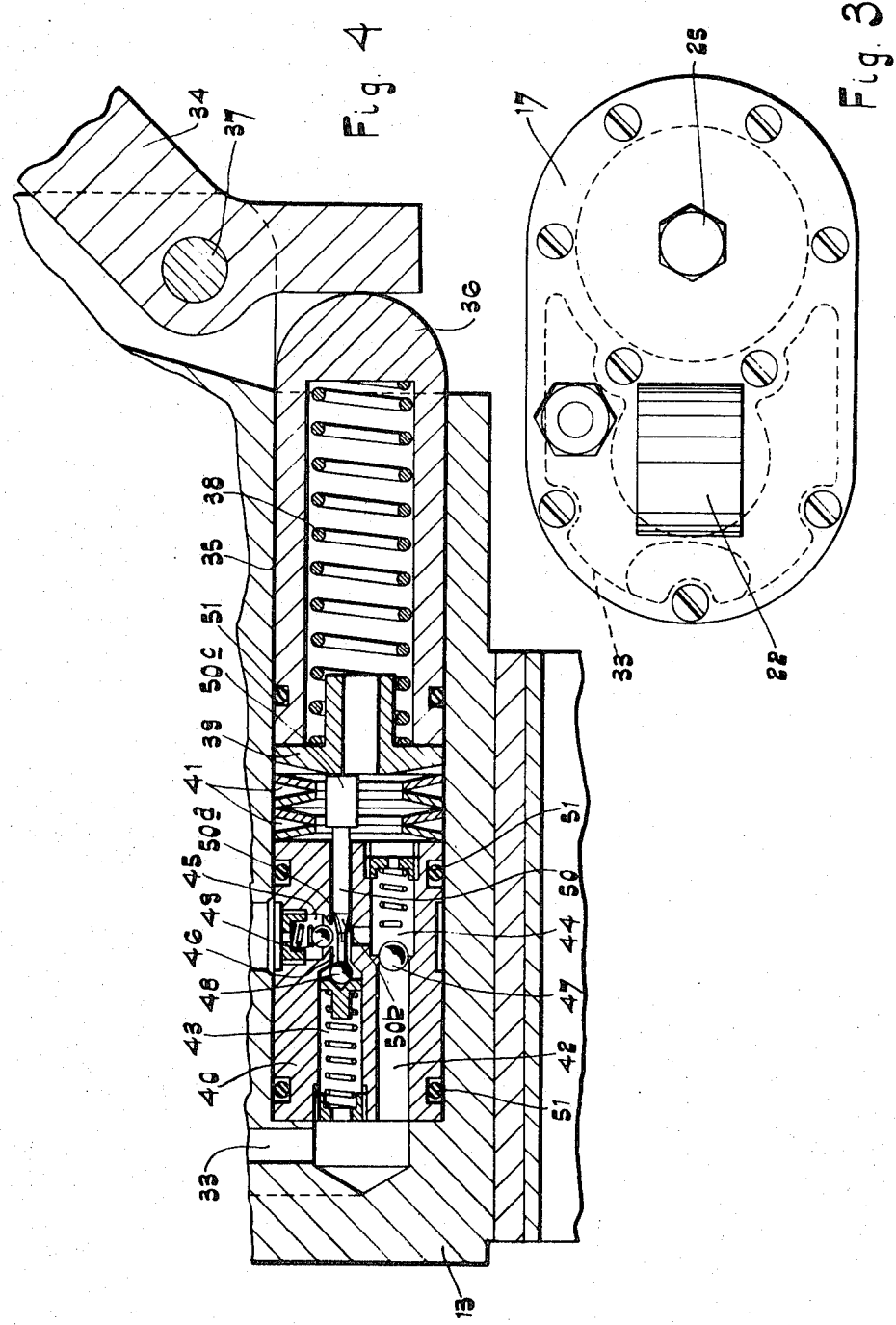

SUSPENSION UNIT FOR VEHICLE SEATS

BACKGROUND OF THE INVENTION

1. Field of the Invention

This invention relates to suspension units primarily but not exclusively for use with vehicle seats.

In certain types of vehicles, the vehicle seats include a frame which is rigidly secured to the chassis and supports a seat proper and the latter is movable relative to the frame under the control of a seat suspension unit acting between the seat proper and the frame and functioning primarily as a shock absorber.

2. Description of the Prior Art

Known vehicle seat suspension units generally rely on coiled springs for their shock absorbing action and are often, in practice, difficult to adjust to the requirements of different users.

SUMMARY OF THE INVENTION

The object of the present invention is to provide a new or improved suspension unit suitable for use with vehicle seats of the kind referred to and especially such seats for all agricultural, constructional and commercial vehicles, including any other vehicle which has a heavy vibration which would transmit from the chassis to the seat.

According to the invention a suspension unit comprises a first chamber containing a piston slidable therein, a second chamber in communication with the first chamber, means for controlling the rate of flow of hydraulic fluid between said chambers, a variable volume pre-pressurized pneumatic container containing a preselected quantity of compressed gas and arranged to pressurize the hydraulic fluid in said first and second chambers, and a hydraulic reservoir with means for transferring hydraulic fluid between the reservoir and the assembly of said first and second chambers so as to adjust the pressurization of the hydraulic fluid therein by compression or expansion of the variable volume pneumatic container.

The arrangement therefore is such that, in use, the unit can be connected to the frame of a vehicle seat of the kind specified and the piston can be connected to the seat proper or vice versa. Any vibrations transmitted from the vehicle to the frame are absorbed by movement of the piston in its chamber against the resistance afforded by the pressurized hydraulic fluid so that a person occupying the seat is not subjected to an uncomfortable ride.

It will be noted that the unit is completely self-contained. This presents the advantages that the unit can be easily fitted to a vehicle seat and can be made compact so that it takes up very little space in the vehicle. Also, it is possible for the suspension unit in accordance with the invention to be used for the suspension of other items, for example hospital beds, equipment trolleys and so forth.

The means for transferring hydraulic fluid between the reservoir and the communicating first and second chambers are preferably manually operable. Thus, the degree of pressurization of the hydraulic fluid can be adjusted by the user according to his or her requirements, both to compensate for the user's weight and to give a "hard or soft" ride, such adjustment being performed by the user manually operating the said means so as to cause hydraulic fluid to be transferred from the reservoir to the communicating first and second chambers or in the opposite direction as appropriate, thereby to compress or expand the pneumatic container.

The said means preferably comprise a manually operable pump for transferring hydraulic fluid from the reservoir to the communicating chambers, and a manually operable release valve for transferring hydraulic fluid from the chambers to the reservoir.

The first and second chambers may be in communication with one another through an aperture of predetermined size which affords a constriction so as to control the flow of fluid therethrough. Preferably, however, the first and second chambers are in communication with one another through valve means arranged to afford a substantially increased resistance to flow of hydraulic fluid in one direction as compared with the other.

Conveniently, the variable volume pneumatic container comprises a flexible bag precharged with compressed gas and disposed within the second chamber. Alternatively, however, the second chamber could be divided into two compartments by means of a free piston or a flexible diaphragm, one of said two compartments containing the hydraulic fluid and the other containing said preselected quantity of compressed gas.

The invention further resides in a vehicle seat incorporating such a suspension unit operatively interposed between the seat proper and its supporting frame.

A preferred embodiment of a suspension unit according to the invention will now be described by way of example with reference to the accompanying drawings.

BRIEF DESCRIPTION OF THE DRAWINGS

In the drawings:

FIG. 3 is a plan view of the unit, and FIG. 4 is an enlarged vertical section through the lower part of the unit, showing the combined pump and release valve.

DESCRIPTION OF THE PREFERRED EMBODIMENT

Figures 1, 2:
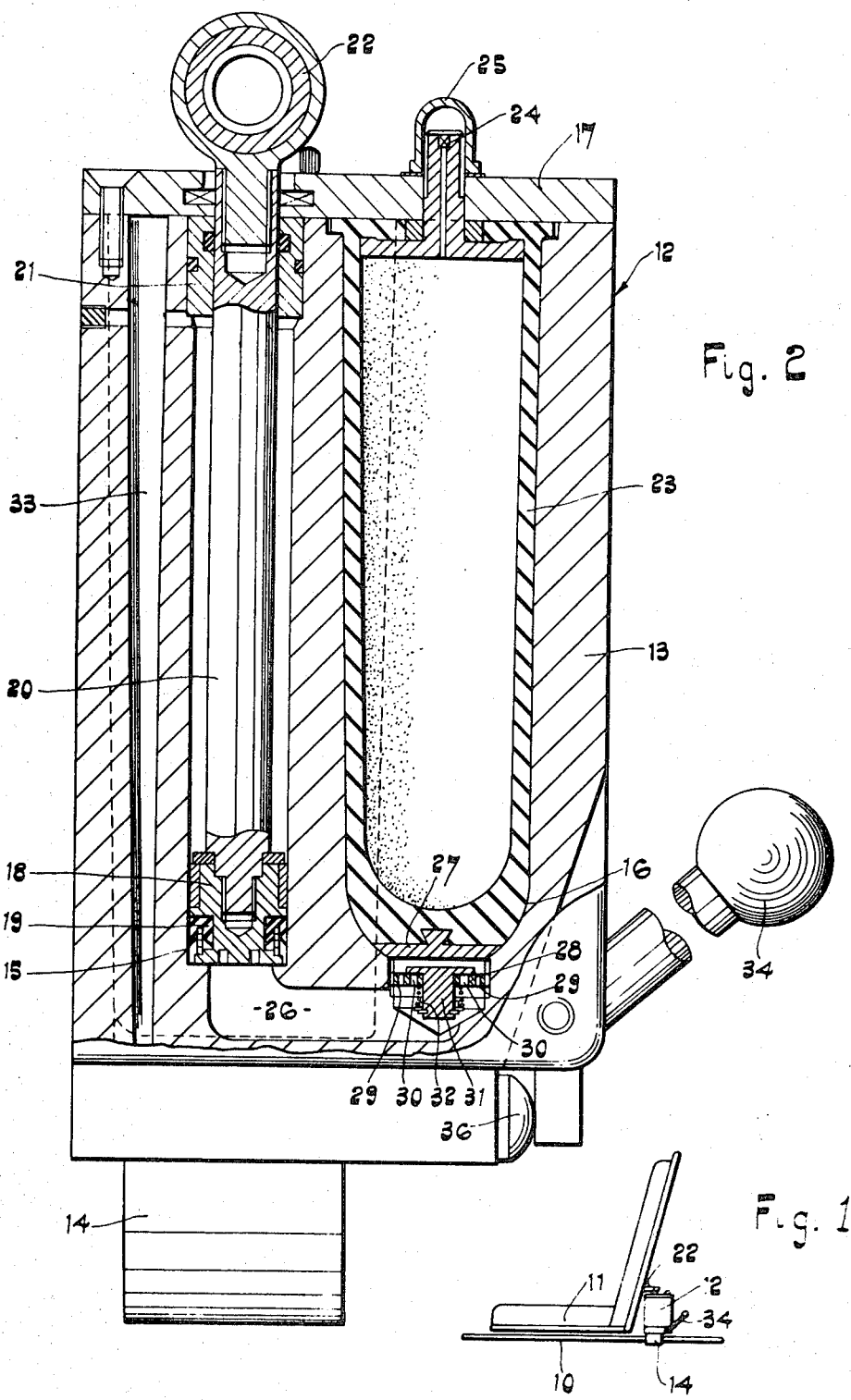
FIG. 1 is a diagrammatic illustration of a vehicle seat fitted with the suspension unit of this example.
FIG. 2 is a vertical section through the suspension unit.

Referring first to FIG. 1 of the drawings, this shows a vehicle seat comprising a frame 10 which is rigidly mounted on the chassis of a vehicle, for example a tractor, and supports a seat 11. Connected between the frame 10 and the seat 11 is a seat suspension unit 12 in the form of a hydraulic shock absorber.

Turning now to FIGS. 2, 3 and 4, the seat suspension unit 12 comprises a housing 13 in the form of a block-like body carrying at its lower end an apertured fixing lug 14 whereby it can be secured to the frame of a vehicle seat. The housing 12 is formed internally with two chambers 15 and 16 which are disposed side-by-side in axially parallel relationship and open at the top of the housing, the chambers being closed by a top closure plate 17.

A piston 18 provided with a sealing ring 19 is slidably mounted in the chamber 15 and is carried by a piston rod 20 which extends upwardly through a sealing arrangement 21 and the top closure plate 17 and is fitted at its upper end outside the housing 13 with an apertured fixing lug 22 whereby the piston can be secured to the seat proper of a vehicle seat.

Accommodated in the chamber 16 which is of slightly downwardly tapering form, is a pneumatic container constituted by a thick walled, flexible rubber bag 23 which is precharged compressed compressed gas which, if under a high pressure, will be a non-combustible gas such as drinitrogen. This bag is provided at its upper end with an inlet valve 24 which projects outwardly through the top closure plate 17 so that the bag can be pressurized after it has been fitted in the chamber 16. The valve 24 has a valve cap 25 and is preferably permanently sealed so that the user cannot adjust the preselected quantity of compressed gas contained in the bag once the unit is in service.

The chambers 15 and 16 are in communication with one another at their lower ends through a conduit 26 formed in the housing 13. This conduit contains hydraulic fluid which is acted upon by a rigid end piece 27 attached to the lower end of the bag 23 in the chamber 16 so that the fluid is pressurized due to the prepressurization of the air or other gas within the bag and therefore urges the piston 18 in the chamber 15 upwardly.

Hydraulic fluid can flow between the chambers 15 and 16 through valve means located in the conduit 26. This valve means comprises a fixed disc 28 disposed across the path of flow of fluid between the two chambers and formed with two diametrically opposed fine bores 29 and two concentric arcuate slots 30. Slidably mounted in a central aperture in the disc 28 is a valve member 31 having at its upper end an outwardly extending flange arranged to normally seat against the disc 28 so as to close the arcuate slots 30 but not the bores 29. The valve member is urged downwardly into this normal position by a spring 32 interposed between the underside of the disc 28 and a circumferential projection adjacent the lower end of the member.

The piston 18 is shown in its lowermost position which corresponds approximately to the minimum amount of hydraulic fluid within the conduit 26 and the chambers 15 and 16. In practice, however, the piston will normally occupy a position above the position shown.

In use, if a downward force is exerted on the lug 22, for example due to the vehicle passing over a bump, the piston 18 is forced downwardly. This movement is transmitted to the hydraulic fluid which therefore acts through the arcuate slots 30 of the aforesaid valve means on the underside of the flange of the valve member 31 to raise the latter against the action of its spring 32. Hydraulic fluid can therefore flow through the conduit 26 from the chamber 15 into the chamber 16 at a rate determined by the combined cross sectional areas of the arcuate slots 30 plus the combined cross sectional areas of the bores 29. Thus, some resistance is afforded to the downward movement of the piston 18 so that the unit functions as a shock absorber, and the pressure of the hydraulic fluid increases with consequent compression of the flexible bag 23.

When the force on the lug 22 is removed, the increased pressure within the hydraulic system will tend to force the piston 18 upwardly again. This causes the valve member 31 to return to its normal position wherein its seats on the disc 28 and thereby closes the arcuate slots 30, so that the return flow of hydraulic fluid is controlled solely by the combined cross sectional areas of the bores 29. The piston 18 thus returns to its initial position more slowly than it was initially displaced downwardly.

The housing 13 is formed with a chamber 33 which is substantially of U-shape in plan view and is arranged around the chamber 15 (see FIG. 3) and this chamber 33 serves as a reservoir for hydraulic fluid. The reservoir opens at the upper end of the housing 13 so that filling thereof is facilitated by removing the top closure plate 17.

Means are provided for transferring hydraulic fluid between the reservoir 33 and the assembly of the chambers 15 and 16 and the conduits 26, whereby the pressurization of the hydraulic fluid can be adjusted, such adjustment being effected by the compression or expansion of the flexible bag 23 resulting from the increase or decrease in the quantity of hydraulic fluid in the hydraulic system. The said means comprises a hydraulic pump for transferring hydraulic fluid from the reservoir to the conduit 26 and a valve for allowing the transfer of hydraulic fluid from the conduit back to the reservoir, the pump and the valve being operable by a common handle 34.

Referring particularly to FIG. 4 of the drawings, the combined pump and valve are removably mounted in a transverse bore 35 which is formed in the lower part of the housing 13 and is open at one end. Slidably mounted in the open end of the bore is a plunger 36 arranged to be acted upon by the handle 34 which is pivoted at 37 on the housing so that movement of the handle up and down produces reciprocation of the plunger 36 in the bore 35. The plunger 36 is hollow and contains a compression spring 38 interposed between the inner end of the cavity in the plunger and a carrier 39 slidably mounted in the bore 35. Accommodated in the inner end of the bore 35 is a valve body 40 and arranged between this body and the spring carrier 39 are a number of annular belville washers 41.

The valve body 40 is formed with two bores 42 and 43 which are in communication with the reservoir 33, a bore 44 which is aligned, and communicates with the bore 42 and is also in communication with the interior of the plunger 36, a bore 45 which communicates with the conduit 26, and a chamber 46 in communication with all the bores. Arranged between the bores 42 and 44 is a one way valve 47 which permits the flow of hydraulic fluid only in the direction from the bore 42 into the bore 44. A one way valve 48 is provided between the bore 43 and the chamber 46 and is arranged to permit the flow of hydraulic fluid only in the direction from the chamber into the bore, and there is likewise provided between the bore 45 and this chamber a one way valve permitting the flow of fluid only from the chamber into the bore. Each of the one way valves 47, 48 and 49 comprises a ball which is spring urged into engagement with a valve seat. The valve body 40 is also formed with a bore which is aligned with the bore 43 and has slidably mounted therein a pin 50. This pin 50 has at one end thereof a tip 50a and an inclined cam portion 50b which are disposed in the chamber 46, and at the other end an enlarged portion 50c arranged to abut the spring carrier 39. Sealing rings 51 are provided around the plunger 36 and the valve body 40.

The combined pump and valve are arranged to operate in the following manner. To operate the pump in order to transfer hydraulic fluid from the reservoir 33 to the assembly of the chambers 15, 16 and the conduit 26, the handle 34 is first raised thereby allowing the plunger 36 to be moved outwardly of the bore 35, i.e., to the right as viewed in FIG. 4, under the action of the spring 38. This results in hydraulic fluid being drawn from the reservoir 33, through the bore 42, the one way valve 47, and the bore 44 into the interior of the plunger. The handle 34 is then depressed until the plunger is moved into a predetermined inner position (as shown) in which its inner end has come into contact with the spring carrier 39 which bears against the assembly of belville washers 41, and the hydraulic fluid in the plunger 36 is thereby forced through the chamber 46, the one way valve 49 and the bore 45 into the conduit 26. It is to be noted that the spring of the valve 49 is weaker than the spring of the valve 48 so that the latter does not open under the hydraulic fluid pressure. Thus, by moving the handle 34 up and down an appropriate number of times, the volume of hydraulic fluid in the chambers 15, 16 and the conduit 26 can be increased to a desired extent.

To operate the valve to allow for the transfer of hydraulic fluid from the chambers 15, 16 and the conduit 26 back to the reservoir 33, the handle 34 is depressed to such an extent as to move the plunger 36 beyond the aforesaid predetermined inner position, this movement being effected against the resistance of the assembly of belville washers 41. The spring carrier 39 is therefore forced towards the valve body 40 and pushes the pin 50 to the left as viewed in FIG. 4. As a result, the tip 50a of the pin engages and unseats the ball of the one way valve 48 against the action of its spring, and the inclined cam portion 50b similarly engages and unseats the ball of the one way valve 49, thereby allowing hydraulic fluid to flow from the conduit 26 through the bore 45, the valves 49 and 48, and the bore 43 into the reservoir 33. The handle 34 is maintained depressed until a required quantity of hydraulic fluid has been returned to the reservoir 33.

In order to compensate for the weight of a person sitting in the vehicle seat, the volume of hydraulic fluid within the chambers 15, 16 and the conduit 26 can be increased by means of the pump so that the seat is raised. The quantity of hydraulic fluid within the chambers 15, 16 and the conduit 26 can be adjusted so that, despite differences in the weight of different users, the piston 18 normally occupies a position approximately half way up its cylinder 15 when the user occupies the seat. Thus, the preloading of the hydraulic system is variable in a very simple manner to suit the requirements of different users. Of course, the extent of pressurization of the hydraulic fluid can be varied in order to provide for a relatively "harder or softer" ride in the same manner.

In one alternative embodiment of the invention, it may be possible to dispense with the valve means 28 – 32 entirely and to dimension the conduit 26 so as to afford the requisite controlled rate of fluid flow between the chambers 15 and 16. Of course, in this case the same restriction is imposed on the fluid flow in the course of both upward and downward movement of the piston 18.

In a further alternative, the bag 23 may be omitted and a free piston may be slidably disposed in the chamber 16. In this case, the space below the free piston would communicate with the conduit 26 and would be filled with hydraulic fluid, and the space above the free piston would contain a preselected quantity of gas or air under pressure.

I claim:

1. A self-contained suspension unit comprising a housing defining intercommunicating first and second chambers containing hydraulic fluid; a piston slidably mounted in said first chamber; a variable volume prepressurized pneumatic container within said second chamber, said container containing a preselected quantity of compressed gas and being arranged to pressurize the hydraulic fluid in the first and second chambers; means for controlling the rate of flow of hydraulic fluid between the chambers produced by movement of the piston in said first chamber; a hydraulic reservoir disposed within the housing; a manually operable pump for transferring hydraulic fluid from the reservoir to the intercommunicating chambers to increase the pressurization of the hydraulic fluid in said chambers by compression of the pneumatic container and a manually operable release valve for transferring hydraulic fluid from the interconnecting chambers to the reservoir to decrease the pressurization of the hydraulic fluid in said chambers by expansion of the pneumatic container, the pump and the valve being accommodated in the housing.

2. A suspension unit according to claim 1, wherein the pump and the valve are combined and a single handle is provided for operating both the pump and the valve.

3. A suspension unit according to claim 2, wherein the combined pump and valve include a hollow plunger mounted in the housing for movement by the said handle between two positions and also beyond one of said positions and means affording resistance to movement of the plunger by the handle beyond said one position, the arrangement being such that reciprocation of the plunger between the said two positions draws hydraulic fluid from the reservoir into the interior of the plunger and then forces the fluid into the intercommunicating chambers, and movement of the plunger beyond the said one position against the resistance provided by the said means permits hydraulic fluid to flow from the chambers into the reservoir.

4. A suspension unit according to claim 3, wherein the combined pump and valve further include a valve body incorporating a number of one way valves disposed in bores which communicate with the reservoir, the communicating chamber and the interior of the hollow plunger, and which are arranged, on reciprocation of the plunger between the said two positions, to route hydraulic fluid from the reservoir, into the interior of the plunger and then into the chambers, and a slidable valve release element arranged to be moved by the plunger when the latter is moved beyond the said one position, and to thereupon open appropriate ones of the valves so as to permit hydraulic fluid to flow from the chambers into the reservoir.

5. A suspension unit as claimed in claim 1, wherein the means for controlling the rate of flow of hydraulic fluid between the chambers comprise valve means arranged to afford a substantially increased resistance to flow of hydraulic fluid in one direction as compared with the other.

6. A suspension unit as claimed in claim 1, wherein the variable volume pneumatic container comprises a flexible bag precharged with compressed gas and disposed within the second chamber.

7. A vehicle seat comprising a frame part, a seat part supported by the frame and movable relatively thereto, and a suspension unit operatively interposed between the frame part and the seat part, this suspension unit comprising a housing connected to one of said parts and defining intercommunicating first and second chambers containing hydraulic fluid; a piston connected to the other of said parts and slidably mounted in said first chamber; a variable volume prepressurized pneumatic container within said second chamber, said container containing a preselected quantity of compressed gas and being arranged to pressurize the hydraulic fluid in the first and second chambers; means for controlling the rate of flow of hydraulic fluid between the chambers produced by movement of the piston in said first chamber; a hydraulic reservoir disposed within the housing; a manually operable pump for transferring hydraulic fluid from the reservoir to the intercommunicating chambers to increase the pressurization of the hydraulic fluid in said chambers by compression of the pneumatic container and a manually operable release valve for transferring hydraulic fluid from the intercommunicating chambers to the reservoir to decrease the pressurization of the hydraulic fluid in said chambers by expansion of the pneumatic container, the pump and the valve being accommodated in the housing.

* * * * *